(12) United States Patent
Kunz et al.

(10) Patent No.: US 10,903,746 B2
(45) Date of Patent: Jan. 26, 2021

(54) LOAD DEPENDENT IN-RUSH CURRENT CONTROL WITH FAULT DETECTION ACROSS ISO-BARRIER

(71) Applicant: TEXAS INSTRUMENTS INCORPORATED, Dallas, TX (US)

(72) Inventors: Keith Edmund Kunz, Bryan, TX (US); Anant Kamath, Plano, TX (US); Maurizio Granato, Milan (IT); Prajkta Vyavahare, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/669,345

(22) Filed: Aug. 4, 2017

(65) Prior Publication Data

US 2018/0041130 A1   Feb. 8, 2018

Related U.S. Application Data

(60) Provisional application No. 62/371,451, filed on Aug. 5, 2016.

(51) Int. Cl.
*H02M 3/335* (2006.01)
*H02M 1/32* (2007.01)

(52) U.S. Cl.
CPC ......... *H02M 3/33507* (2013.01); *H02M 1/32* (2013.01); *H02M 3/33523* (2013.01)

(58) Field of Classification Search
CPC ............ H02M 3/00; H02M 3/22; H02M 3/24; H02M 3/28; H02M 3/325; H02M 3/335;
(Continued)

(56) References Cited

U.S. PATENT DOCUMENTS 5,414,609 A   5/1995   Levran et al.
6,147,393 A   11/2000  Zommer
(Continued)

FOREIGN PATENT DOCUMENTS

JP   6-251995   9/1994

OTHER PUBLICATIONS

TPS6205x Datasheet, "800-mA Synchronous Step-Down Converter", Texas Instruments, TPS62059-TPS62056, Sep. 2002-revides Oct. 2003, pp. 1-25. (Year: 2002).*
(Continued)

*Primary Examiner* — Thienvu V Tran
*Assistant Examiner* — Carlos O Rivera-Perez
(74) *Attorney, Agent, or Firm* — Ray A. King; Charles A. Brill; Frank D. Cimino

(57) ABSTRACT

Methods and systems for providing electrical power using an isolated DC-DC converter include: using a power supply to provide multiple amplitudes of open loop current to a primary side of a transformer. The amplitudes are selected to increase stepwise, at predetermined times, to ramp a voltage across output terminals connected to a secondary side of said transformer so that after said power supply provides a maximum open loop current amplitude, said voltage reaches a threshold sufficient to enable a closed loop controller connected to said output terminals to send a feedback signal to said primary side. The threshold voltage is insufficient to fully power said output terminals. The feedback signal is selected to control said power supply to increase current to said primary side at closed loop current levels until said output terminals are fully powered.

19 Claims, 8 Drawing Sheets

(58) Field of Classification Search
CPC ......... H02M 3/33507; H02M 3/33515; H02M
3/33538; H02M 3/33576; H02M 3/33523;
H02M 3/3353; H02M 3/33546; H02M
3/33553; H02M 3/337; H02M 3/3376;
H02M 3/338; H02M 3/3385; H02M 1/08;
H02M 1/32; H02M 1/36; H02M
2001/0006; H02M 2001/0009; H02M
2001/0016; H02M 2001/0019; H02M
2001/0022; H02M 2001/0025; H02M
2001/0029; H02M 2001/327; H02M
2001/0048; H02M 2001/0054; H02M
2001/0058; Y10S 323/901; Y10S 323/908
USPC .... 363/15–26, 40–43, 49, 50, 55–56.12, 74,
363/89, 95–99, 131–134; 323/234, 238,
323/242, 247, 266, 271–277, 281–288,
323/304, 311, 312, 326, 351, 901, 908
See application file for complete search history.

(56) References Cited

U.S. PATENT DOCUMENTS

| | | | |
|---|---|---|---|
| 6,456,511 B1* | 9/2002 | Wong | H02M 1/36 363/21.13 |
| 8,436,709 B2 | 5/2013 | Fouquet et al. | |
| 8,466,535 B2 | 6/2013 | Hopper et al. | |
| 8,674,418 B2 | 3/2014 | Poddar et al. | |
| 9,000,675 B2* | 4/2015 | Chang | H05B 45/50 315/201 |
| 9,035,422 B2 | 5/2015 | Khanolkar et al. | |
| 2007/0058402 A1 | 3/2007 | Shekhawat et al. | |
| 2007/0188288 A1 | 8/2007 | Ishii | |
| 2009/0185397 A1* | 7/2009 | Forghani-Zadeh | H02M 1/36 363/18 |
| 2011/0199799 A1 | 8/2011 | Hui et al. | |
| 2012/0002377 A1 | 1/2012 | French et al. | |
| 2012/0099345 A1* | 4/2012 | Zhao | H02M 1/36 363/21.05 |
| 2013/0001735 A1 | 1/2013 | Hopper et al. | |
| 2013/0037908 A1 | 2/2013 | Hopper et al. | |
| 2013/0037909 A1 | 2/2013 | French et al. | |
| 2016/0006356 A1 | 1/2016 | Nirantare et al. | |
| 2016/0118904 A1 | 4/2016 | Yoshikawa et al. | |
| 2016/0149504 A1* | 5/2016 | Quigley | H02M 1/36 363/21.04 |
| 2016/0248328 A1* | 8/2016 | Zhang | H02M 3/1584 |
| 2016/0352237 A1* | 12/2016 | Quigley | H02M 3/33546 |

OTHER PUBLICATIONS

"Non-halogenated Low CTE BT Resin Laminate for IC Plastic Packages", MGC Mitsubishi Gas Chemical Company, Inc., pp. 1-5, available at www.jgc.co.jp/eng/products/lm/btprint/lineup/hfbt.html on Aug. 26, 2013.
"G200 BT/Epoxy Laminate and Prepreg", Isola Laminate Systems Corp., Data Sheet #5027/3/01, pp. 1-2, 1999.
"LTM2881 Complete Isolated RS485/RS422 uModule Transceiver + Power", Linear Technology Corporation, LT0213 Rev F, pp. 1-24, 2009.
David Krakauer, "Anatomy of a Digital Isolator", Analog Devices, Inc., Technical Article MS-2234, pp. 1-3, Oct. 2011.

* cited by examiner

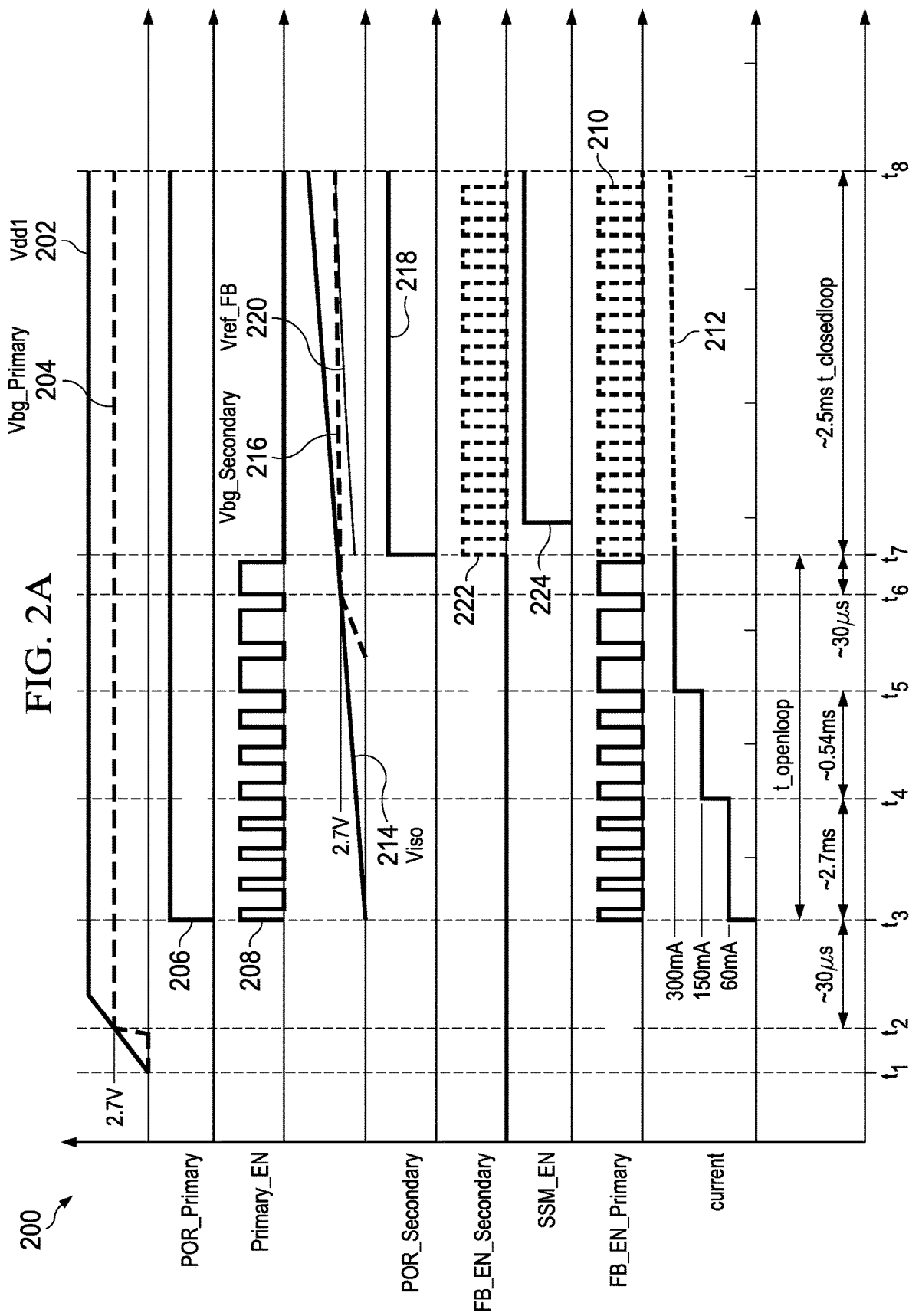

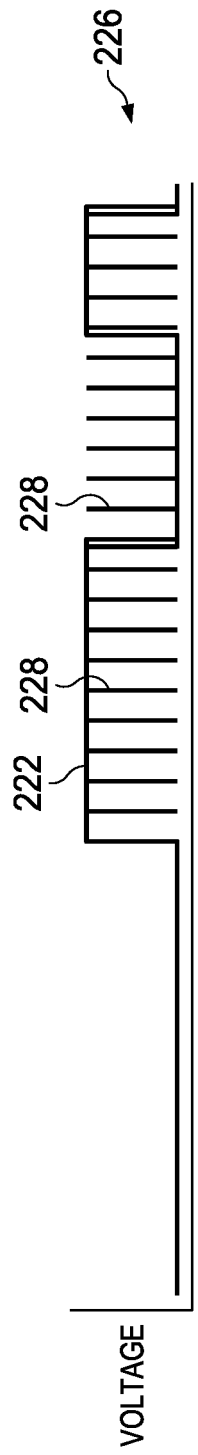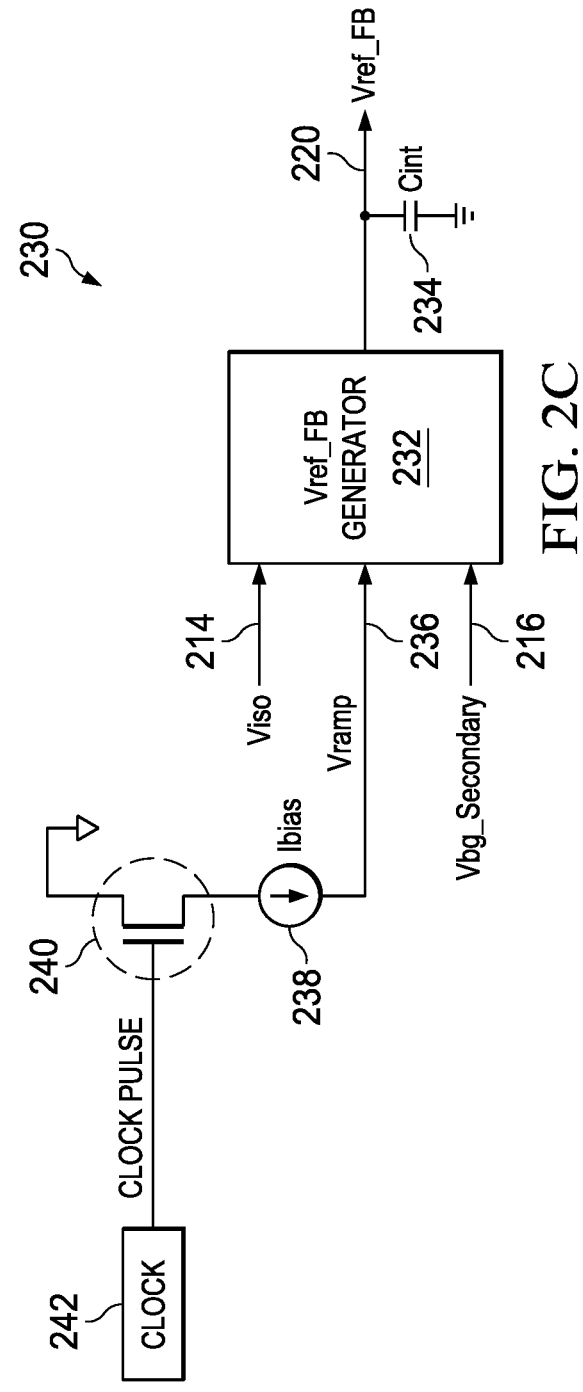
FIG. 2B
FIG. 2C

LOAD DEPENDENT IN-RUSH CURRENT CONTROL WITH FAULT DETECTION ACROSS ISO-BARRIER

CROSS-REFERENCE

Priority is claimed from U.S. Provisional App. No. 62/371,451, filed on Aug. 5, 2016, titled "Load Dependent In-Rush Current Control With Fault Detection Across Iso-Barrier", which is hereby incorporated by reference.

BACKGROUND

The present application relates to DC-DC converters, and more particularly to limiting in-rush current during startup of isolated DC-DC converters.

Note that the points discussed below may reflect the hindsight gained from the disclosed innovative scope, and are not necessarily admitted to be prior art.

Isolated DC-DC converters comprise a transformer, with a power generating input side, typically called the primary side, and a power output side, typically called the secondary side. The difference between an isolated converter and a non-isolated converter is that in an isolated converter, the primary side and the secondary side have different grounds, and in a non-isolated converter, the primary side and the secondary side share the same ground (using, for example, an inductor, rather than a transformer, to convert voltage). In an isolated DC-DC converter, there is an isolation barrier enforcing galvanic isolation between the input side and the output side. Galvanic isolation means that current flow between the input side and output side is prevented by the isolation barrier—there is no direct conduction path. Energy and/or information can be exchanged between the input side and output side of an isolated DC-DC converter using, for example, capacitance or induction.

Isolated DC-DC converters can be small enough to fit within an integrated circuit ("IC") package, but may require significant current on the primary side to drive the secondary side across the isolation barrier, i.e., the gap between the transformer coils. Such converters can be used for transferring power from a high voltage domain to a low voltage domain, e.g., from a power line to a set of consumer electronics, or from a battery on an electric vehicle to the electronics on that vehicle. Grounds in high voltage regimes (e.g., the power line or battery) may have, for example, 1000V or 1500V swings that the devices designed to connect to those grounds are designed to tolerate. Grounds in the low voltage regimes may have much smaller swings—for example, much less than 1V—and devices connected to those low voltage grounds could be rendered inoperative if subjected to the voltage swings tolerated in a high voltage regime. Isolation barriers are used to separate high voltage regimes from low voltage regimes so that power transfer can be performed without damaging low voltage components.

Typically, isolated DC-DC converters fully drive the primary side through startup. "In-rush current" is the maximum instantaneous input current drawn by an electrical device during startup. Fully driving the primary side through startup can result in excessive in-rush current. Excessive in-rush current, e.g., during uncontrolled startup, can result in the load power at the secondary side overshooting the designed operating parameters of devices connected to the converter's output. This overshoot can be significant, e.g., a 1 Volt overshoot on a secondary side designed to operate at 5 volts when fully powered. Large overshoots, which generally correspond to excessive in-rush currents, can potentially damage load circuits. Design compensating for excessive in-rush current may involve limiting maximum output power below what would be possible without having to avoid overshooting output power targets following uncontrolled startup, or relying on thermal shutdown to limit power overdraw.

The inventors endeavor to disclose new and advantageous approaches to ramping the output power of an isolated DC-DC converter to thereby control in-rush current during startup and fault events, as further described below.

SUMMARY

The inventors have discovered new approaches to methods, devices and systems for controlling in-rush current during startup of an isolated DC-DC converter.

Preferred embodiments include, for example, providing electrical power using an isolated DC-DC converter, including the actions of: a) providing current to a primary side of a transformer at multiple predetermined open loop current levels using a power supply, said power supply providing said open loop current levels in increasing amplitude order and at predetermined times, said open loop current levels and times being selected to ramp a voltage across output terminals connected to a secondary side of said transformer so that after said power supply provides a maximum one of said open loop current levels, said voltage reaches a threshold sufficient to enable a closed loop controller connected to said output terminals to send a feedback signal to said primary side, said threshold being insufficient to fully power said output terminals; and b) sending said feedback signal to said primary side using said closed loop controller when said voltage reaches said threshold, said power supply controlled in response to said feedback signal to continue providing current to said primary side at closed loop current levels, said feedback signal selected to control said power supply to increase said closed loop current levels until said output terminals are fully powered.

The inventors have also discovered new approaches to methods, devices and systems for communicating clock and data signals from the primary side to the secondary side of an isolated DC-DC converter.

Preferred embodiments include, for example, an isolated DC-DC converter, including: a first transformer with a primary side and a secondary side; a second transformer with a primary side and a secondary side; a power supply electrically connected to provide current to said transformers; a clock switch electrically connected to said power supply and said first transformer's primary side, said clock switch configured to control provision of said current to said first transformer's primary side such that an open-close frequency of said clock switch will cause said first transformer's secondary side to output a device clock signal at a selected clock frequency; a data switch electrically connected to said power supply and said second transformer's primary side, said data switch configured to control provision of said current to said second transformer's primary side such that an open-close frequency of said data switch will cause said second transformer's secondary side to output a data signal comprising selected data; and multiple output terminals, said output terminals being electrically connected to said secondary sides of said first and second transformers, said frequencies of said clock switch and said data switch being selected to maintain a selected voltage across said output terminals.

Numerous other inventive aspects are also disclosed and claimed.

BRIEF DESCRIPTION OF THE DRAWINGS

The disclosed inventions will be described with reference to the accompanying drawings, which show important sample embodiments and which are incorporated in the specification hereof by reference, wherein:

FIG. 2A shows an example of a timing diagram for an isolated DC-DC converter with feedback across the isolation barrier of a transformer to thereby control in-rush current.

FIG. 2B shows an example of a feedback signal, plotting voltage over time.

FIG. 2C shows an example of an electrical block diagram of a circuit for generating a ramping voltage used to generate the feedback signal.

DETAILED DESCRIPTION OF SAMPLE EMBODIMENTS

Figure 1:
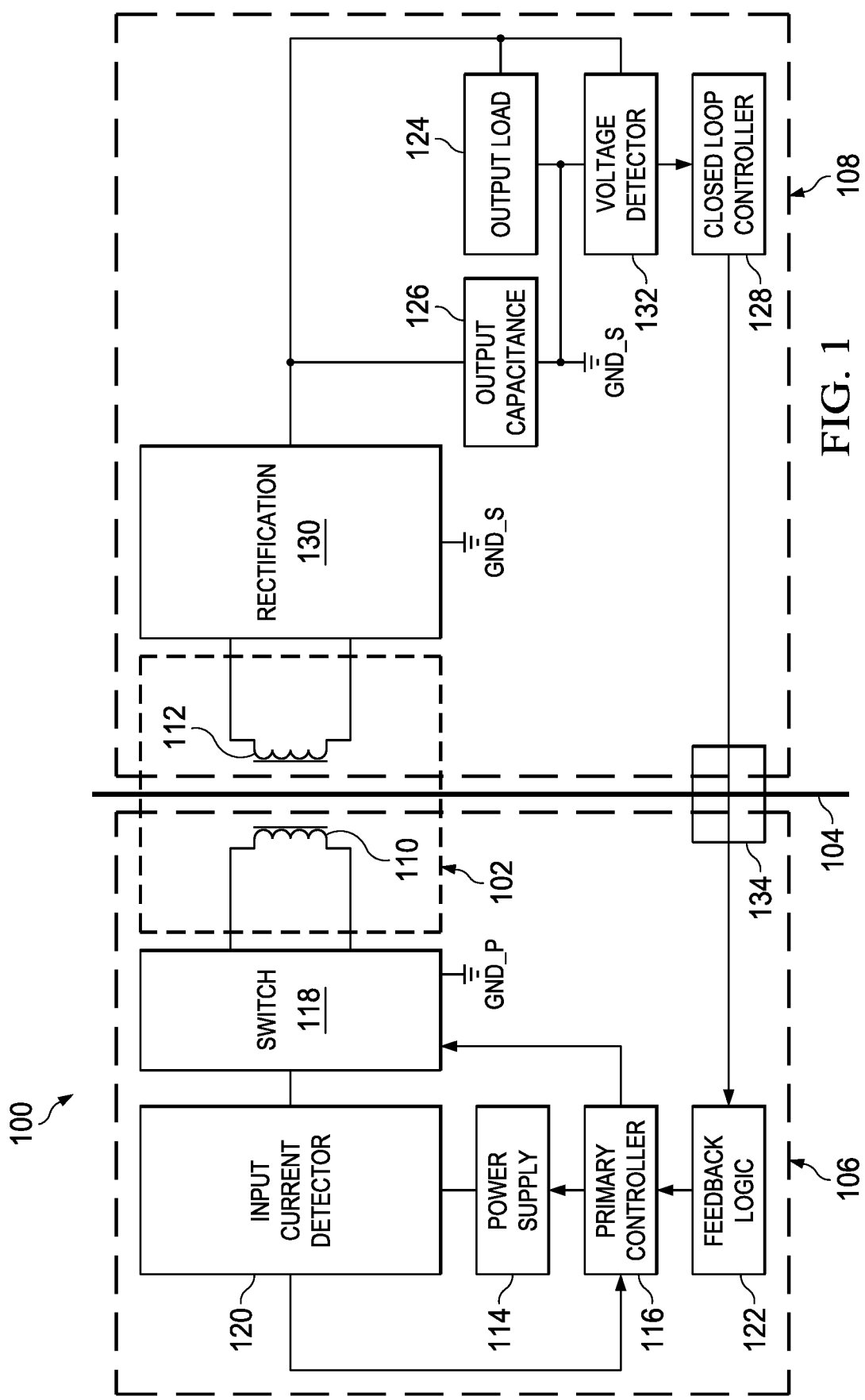
FIG. 1 shows an example of an electrical block diagram of an isolated DC-DC converter with feedback across a transformer's isolation barrier to thereby control in-rush current.

The numerous innovative teachings of the present application will be described with particular reference to presently preferred embodiments by way of example, and not of limitation. The present application describes inventive scope, and none of the statements below should be taken as limiting the claims generally.

The present application discloses new approaches to controlling provision of power using an isolated DC-DC converter to enable rapid startup while preventing excessive in-rush current. This is done by providing power to the primary side of a transformer at a pre-determined increasing rate until a secondary side of the transformer has received sufficient power to provide feedback communications to the primary side; then sending a feedback signal from the secondary side of the converter to the primary side of the converter that continuously indicates how much power should be provided to the primary side to continue rapidly charging an output load connected to the secondary side; and controlling provision of power to the primary side in dependence on the feedback signal to charge the output load.

Some exemplary parameters will be given to illustrate the relations between these and other parameters. However it will be understood by a person of ordinary skill in the art that these values are merely illustrative, and will be modified by scaling of further device generations, and will be further modified to adapt to different materials or architectures if used.

Embodiments as disclosed herein enable a small, loosely coupled isolated DC-DC converter to be integrated into a package to be used for, e.g., gate drivers, isolated communications, and bringing power from a high voltage line to consumer electronics. This means that the transformer can be a low volume transformer. A small transformer will generally tend to have a relatively small inductance and, because the separation between inductor plates determines isolation voltage, a relatively small isolation voltage. This means that to achieve both high voltage isolation and small volume, the transformer will generally have both lower coupling factor and lower inductance value, which will result in an increased amount of high frequency noise and high peak currents. Because of the lower coupling factor, this type of packaged transformer will generally draw a large current to transport power across the isolation barrier. These features could tend to make the output of the transformer more prone to undesired overshoot. However, such tendencies are mitigated in preferred embodiments.

In preferred embodiments, overshoot is avoided by controlling startup rate (the rate of secondary side voltage ramp), and by making the startup rate independent of the load current, the load capacitance and the supply voltage. This is done (for example, and as more fully described below) by monitoring the voltage across the output load connected to the secondary side, and scaling the input current on the primary side in dependence on a feedback signal corresponding to that monitored voltage to thereby achieve a controlled output load voltage ramp.

FIG. 1 shows an example of an electrical block diagram of an isolated DC-DC converter with feedback across a transformer's 102 isolation barrier 104 to thereby control in-rush current. As shown in FIG. 1, a converter 100 comprises an input side 106 and an output side 108, with a transformer 102 that has a primary side 110 on the input side 106 of the converter 100, and a secondary side 112 on the output side 108 of the converter 100. The gap between the primary side 110 and the secondary side 112 comprises an isolation barrier 104. Once both the primary side 110 and the secondary side 112 have sufficient power, communication from the secondary side 112 to the primary side 110 is preferably performed across the isolation barrier 104 to more finely control provision of power to the primary side 110. As a result, fine control of power provided to the secondary side 112 (and circuits connected thereto) can be achieved.

The primary side 110 of the transformer 102 is powered by a power supply 114 which is controlled by a primary controller 116. The primary controller 116 controls the amount of power supplied by the power supply 114 to the primary side 110. The amount of average current provided to the primary side 110 of the transformer 102 can be controlled by, for example, varying the duty cycle percentage of a switch 118 which opens or closes the circuit by which the power supply 114 provides power to the primary side 110. That is, the percentage of time during an open-closed cycle of the switch 118 (e.g., for a 480 MHz switching frequency)

during which the switch 118 is closed and the power supply 114 provides power to the primary side 110 can be incrementally changed to control the fraction of available power that is provided by the power supply 114 to the primary side 110. The duty cycle percentages to be used can also be varied based on, for example, the voltage being provided by the power supply 114 (e.g., 3V or 5V). The switched nature of the power supply 114 causes the current received by the secondary side 112, induced from the primary side 110, to be effectively AC. Generally, the input current provided to the primary side 110 of the transformer 102 is proportional to the input supply voltage, the transformer's 102 inductance, and the duty cycle percentage of the switch 118. The switch 118 is preferably connected to a primary side ground GND_P.

The switch 118 can be, for example, a power FET. The rate of power provision to the primary side 110 can be modified by, for example, changing the properties of the power FET comprising the switch 118. The rate of power provision to the primary side 110 can also be controlled by, for example, changing the switching frequency, the charging time of the transformer, the peak transformer current, or the number of transformers 102 transmitting power.

An input current detector 120 measures the average current being delivered to the primary side 110 and delivers that information to the primary controller 116. The primary controller 116 preferably determines, in dependence on output from feedback logic 122, the amount of power to be provided from the power supply 114 to the primary side 110, and whether the power supply 114 will power the primary side 110 in a normal operation state or in a fault operation state. Output of the feedback logic 122 is preferably determined by a feedback signal received from a closed loop controller 128 located on the output side 108 of the converter 100, as further described below.

The output side 108 preferably includes output terminals 124, an output capacitance 126, a closed loop controller 128 and rectification 130. The output terminals 124 are coupled to the output load of the converter 100 which is, for example, an external resistive or current source load. The output terminals 124 will be referred to as the "output load" 124 herein. The rectification 130, which is further described below, is preferably connected to the terminals of the secondary side 112 of the transformer 102 and to an output side ground GND_S. The output load 124 and the output capacitance 126 are preferably connected in parallel to the rectification 130 and to GND_S, so that charging the output capacitance 126 competes for power with ramping the current delivered to the output load 124 to fully power the output of the converter 100. Current delivered to the output load 124 is preferably determined by measuring the voltage across the output load 124; ramping current corresponds to ramping voltage.

The primary side 110 sends, and the secondary side 112 receives, pulses of current—essentially, AC current. The rectification 130 can comprise passive and/or active rectification, and is used on the output side 108 to make the output of the converter 100 resemble DC current (preferably, as closely as possible), even though AC current is provided across the transformer's 108 isolation barrier 104. The output capacitance 126 also stabilizes the power delivered to the output load 124. The power delivered to the primary side 110, and thus the power delivered to the secondary side 112, is preferably ramped relatively slowly. This results in prioritizing charging of the output load 124 over charging of the output capacitance 126.

An output voltage detector 132 measures the voltage across the output load 124, and is connected to deliver that information to the closed loop controller 128. The closed loop controller 128 is connected via an isolation impedance 134—preferably an isolation capacitor or an isolation transformer—to the feedback logic 122. The isolation impedance 134 prevents current flow between the input side 106 and the output side 108. The closed loop controller 128 provides feedback, in dependence on the measured voltage across the output load 124, to the input side 106 feedback logic 122 once the output load 124 reaches a threshold voltage. The feedback provided by the closed loop controller 128 enables fine control of current drawn from the power supply 114 by the feedback logic 122 and the primary controller 116 in continuing to ramp or otherwise control the current provided to the primary side 110.

A converter 100 as shown in and described with respect to FIG. 1 can be fabricated within, for example, a 10.3 mm×7.5 mm×2.65 mm package.

The overall operation of the converter 100 is now introduced, with example signal timings and triggers discussed in further detail below with respect to, e.g., FIG. 2A. The primary controller 116 commences a startup cycle by causing the power supply 114 to start providing current to the primary side 110. Once the primary side 110 starts to receive current, the secondary side 112 begins to provide power to the output load 124, and the voltage at the output load 124 begins to rise (as measured by the output voltage detector 132). The power supply 114, in combination with the switch 118, ramps the transformer's 102 average input current in a stair-stepping fashion—that is, it incrementally increases average input current by pre-determined amounts at pre-determined intervals. The average input current is preferably stair-stepped because the transformer 102 will generally tend to draw high current until it is fully powered. Incremental increases in power provided to the transformer 102 assist in preventing overshoot while powering up the output side 108 so that communication from the output side 108 to the input side 106—feedback—can be enabled. Also, it is advantageous to power up the primary side 110 at a controlled rate because of the finite impedance from the power supply 114 to the primary side 110; this is generally unnecessary when recovering from fault events because the system has already been powered up. Those of ordinary skill in the art of isolated DC-DC converter design will understand that other patterns of incremental or otherwise predetermined-rate increases in power provided to the primary side 110 can be used during open loop control.

In some embodiments, communication from the input side 106 to the output side 108 can be performed by applying an XOR to the open-closed state of the switch 118, and the intended content of the communicated signal. This is preferably done in short bursts to avoid interrupting power transfer across the isolation barrier 104. The resulting signal (corresponding to the power received by the output load 124) can be demodulated by the closed loop controller 128 to recover the intended communication. Such signaling can be used, in combination with feedback from the secondary side 112 to the primary side 100 as disclosed herein, to enable bidirectional communications across the isolation barrier 104 of an isolated DC-DC converter 100.

Once the voltage at the output load 124 is detected by the output voltage detector 132 as exceeding an activation threshold value, the closed loop controller 128 begins to send a feedback signal 226 to the feedback logic 122. (The feedback signal is further described below, e.g., with respect to FIG. 2B). This feedback signal 226 continues as long as the converter 100 remains in normal (no-fault) operation; interruption in the feedback signal 226 is an indication to the feedback logic 122 that the output side 108 is experiencing a fault condition. The threshold value is preferably selected to exceed a voltage level that the output load 124 would be able to reach if a fault condition existed, such as a short circuit across the output load 124. As long as the feedback signal 226 continues to be sent by the closed loop controller 128, and the input side 106 does not experience a fault, the primary controller 116 will continue to cause the power supply 114 to ramp up to fully driving the transformer 102, so that the output load 124 is driven to and remains at full output voltage. Behavior of the converter 100 when a fault condition occurs is discussed in further detail below.

If, while the feedback signal 226 is activated, the voltage at the output load 124 is detected by the output voltage detector 132 as falling below a fault threshold value, the feedback signal 226 from the closed loop controller 128 to the feedback logic 122 is deactivated. This causes the power supply 114, under control of the primary controller 116 and the feedback logic 122, to cease providing input current to the transformer 102. After a delay (sufficiently brief that excess current draw issues by the primary side 110 will generally not arise), the power supply 114 resumes providing current to the primary side 110 at a pre-determined intermediate level. The intermediate level is selected to enable the output side 108 to power up to a level sufficient to enable feedback once the fault condition has abated (if it abates), and is also selected so that if the fault condition has not abated (or does not abate) then components on the output side 108 will not be damaged. If the fault condition has abated, e.g., it was a transient short event that has been resolved (or resolved itself), then the voltage measured by the voltage detector 132 across the output load 124 will ramp, the closed loop controller 128 will resume sending the feedback signal 226 to the feedback logic 122, and the converter 100 will continue to cause the voltage across the output load 124 to ramp to full as in a normal startup cycle. This case is further described below with respect to FIG. 3.

If the fault condition has not abated, e.g., if it is a DC short circuit, such as a physical short circuit that will require outside intervention to resolve, then the measured voltage at the output load 124 will not reach the threshold for activation of the feedback signal 226. Under these conditions, the converter 100 will remain in open loop mode and the output load 124 will not ramp to full until the fault condition is resolved. This case is further described below with respect to FIG. 4.

If the temperature of the converter 100 is detected to be too high (for example, over 170° C.), e.g., by a thermistor or by detecting the voltage across a bipolar device, then the converter 100 will enter a thermal shutdown condition. Temperature is preferably measured on the primary side 100, because generally, if the converter 100 is fabricated within a single package (e.g., within an IC package), then measuring temperature on one side of the converter (e.g., the input side 106) is sufficient to determine when the power supply 114 should enter a thermal shutdown state; and also because temperature measurement on the primary side 110 enables prompt cutoff of current provided to the primary side 110 without communications from the secondary side 112 to the primary side 110.

When thermal shutdown occurs, the primary controller 116 causes the power supply 114 to cease supplying current to the primary side 110. This will also cause the secondary side 112 to cease supplying power to the output load 124, meaning that the voltage across the output load 124 will fall, resulting in the closed loop controller 128 ceasing to provide the feedback signal 226. Once the temperature of the primary side 110 is detected as being within an acceptable range, the primary controller 116 causes the power supply 114 to perform a normal startup cycle as described above and in FIG. 2A, including stair-stepping current provided to the primary side 110. This case is further described below with respect to FIG. 5.

FIG. 2A shows an example of a timing diagram 200 for an isolated DC-DC converter 100 with feedback across the isolation barrier 104 of a transformer 102 to thereby control in-rush current. For communication from the output side 108 to the input side 106 of the converter 100 to occur, both sides 106, 108 should be powered. As shown in the top row of FIG. 2A, initially, the power supply 114 turns on at time $t_1$ and its supply voltage Vdd1 202 ramps to full; at the beginning of a startup cycle of the converter 100 (e.g., a Power On Reset, or POR), only the input side 106 is powered. The primary controller 116 will then control the switch 118 to cause just enough voltage from the power supply 114 to be made available to the circuits on the output side 108 to start communications from the output side 108 to the input side 106, that is, to proceed to closed loop control of power provision.

An input reference voltage Vbg_Primary 204 produced by the primary controller 116 using the power supply 114 is used to determine when the voltage Vdd1 202 provided by the power supply reaches an input threshold voltage (e.g., 2.7V). Vbg_Primary 204 is preferably a bandgap voltage reference, which will generally produce a fixed (constant) voltage independently of internal process variations, power supply 114 variations, temperature changes, and circuit loading within the converter 100. Vdd1 202 is preferably scaled down, using a resistor-divider circuit, for comparison against the bandgap reference voltage Vbg_Primary 204. Since bandgap reference voltages are generally about 1.25V (determined in part by, e.g., the substrate's bandgap voltage), dividing down Vdd1 202 (or multiplying Vbg_Primary 204) allows the threshold set using Vbg_Primary 204 to correspond to a selected value.

The input threshold voltage is reached by Vdd1 202, as indicated by comparison with Vbg_Primary 204, at time $t_2$. After a comparator delay (e.g., 30 µs), the primary controller 116 produces a signal POR_Primary 206, starting at time $t_3$, which enables open loop control of the input side 106. Open loop control refers to control of the switch 118 by the primary controller 116 (control of power provided by the power supply 114) prior to receipt of the feedback signal 226, or during recovery after cessation of the feedback signal 226 indicates a fault condition. Open loop control is accomplished using a signal Primary_EN 208, also produced by the primary controller 116, which controls the duty cycle of the switch 118. More specifically, FB_EN_Primary 210 controls the duty cycle of the switch 118, and when the input side 106 is in open loop control, Primary_EN 208 controls (preferably, is mirrored by) FB_EN_Primary 210. For example (as shown), FB_EN_Primary 210 being high for a greater percentage of its cycle corresponds to an increased duty cycle percentage of the switch 118. FB_EN_Primary 210, FB_EN_Secondary 222 and current 212 are represented with dotted lines to indicate their measurement-dependent—rather than predetermined—timings and/or levels.

Once open loop control begins (POR_Primary 206 is activated) at time $t_3$, the primary controller 116 causes the power supply 114 to begin providing current 212 to the primary side 110 of the transformer 102. This then causes the secondary side 112 to begin receiving power, and a voltage Viso 214 across the output load 124 to begin ramping shortly after $t_3$. Amperage values for current ramping can be made programmable. For example, 60 mA nominal average current 212 may be provided to the primary side 110 starting at time $t_4$, resulting in, for example, 20 mA being delivered to the output load 124.

After a predetermined interval (e.g., 2.7 ms), the current 212 provided to the primary side 110 by the power supply 114 is increased (stair-stepped) to a higher level sufficient to continue ramping power received by the secondary side 112 at a restrained rate. For example, 150 mA nominal average current 212 may be provided to the primary side 110 starting at time $t_4$, resulting in, for example, 50 mA being delivered to the output load 124. After another predetermined interval (e.g., 0.54 ms), the current 212 provided to the primary side 110 by the power supply 114 is increased again (stair-stepped) to another higher level. For example, 300 mA nominal average current 212 may be provided to the primary side 110, resulting in, for example, 100 mA being delivered to the output load 124 starting at time $t_5$. These current increases (stair-steps) are preferably performed at a lower rate of increase than the power supply 114 is capable of, at a rate selected to avoid overshoot.

As the voltage Viso 214 across the output load 124 approaches an output threshold voltage, an output reference voltage Vbg_Secondary 216, provided by voltage detector 132, is ramped. Vbg_Secondary 216 is preferably a bandgap reference voltage. Viso 214 is compared against Vbg_Secondary 216 by the voltage detector 132, preferably using a resistor-divider network. As explained above with respect to Vdd1 202 and Vbg_Primary 204, dividing down Viso 214 (or multiplying Vbg_Secondary 216) allows the threshold set using Vbg_Secondary 216 to correspond to a selected value.

When the voltage detector 132 determines that Viso 214 has exceeded the output threshold voltage (e.g., 2.7V) at time $t_6$, and after a comparator delay (e.g., ~30 µs), the voltage detector 132 sends a signal POR_Secondary 218 at time $t_7$ activating the closed loop controller 128 and initiating closed loop control. The closed loop controller 128 then begins to send a feedback signal 226 to the feedback logic 122, and the voltage detector 132 begins to ramp a feedback voltage reference Vref_FB 220 in dependence on Viso 124. Generation of Vref_FB 220 is further described below (see FIG. 2C). Also at time $t_7$, Viso 124 is preferably sampled by the voltage detector 132 and Vref_FB 220 is set to a scaled level corresponding to that sampled value. Vref_FB 220 is then ramped until it reaches the Vbg_Secondary 216 voltage, as determined using comparison by the voltage detector 132. Vref_FB 220 is preferably ramped using an internal capacitor and an internal current source (e.g., current generated using the bandgap reference voltage Vbg_Secondary), with a clock on the output side 108 used to control a duty cycle controlling provision of current to ramp Vref_FB 220.

Comparison between the feedback voltage reference Vref_FB 220 and Viso 124 (scaled, e.g., divided down) by the voltage detector 132 is used by the closed loop controller 128 to determine (some or all of) the content of a low frequency signal portion FB_EN_Secondary 222 of a feedback signal 226. This feedback signal 226 will be used by the feedback logic 122 and the primary controller 116 to perform fine control over the switch 118 to ramp current 212 delivered from the power supply 114 to the primary side 110. The closed loop controller 128 also sends a high frequency signal portion 228 (a "ping", see FIG. 2B) to indicate that the output side 108 is in normal (not fault) operation. The feedback signal 226, comprising the low frequency 222 and high frequency 228 (ping) portions, can be encoded by, for example, applying an XOR to FB_EN_Secondary 220 and the ping, to be demodulated by the feedback logic 122. That is, the feedback signal 226 can be switched from high to low, or vice versa, depending on the output of the XOR.

Preferably, continuation of the ping 228 indicates that the output side 108 is in a normal operation state, and cessation of the ping 228 indicates that the output side 108 is experiencing (or has experienced) a fault event. After receiving sufficient pings 228 to determine stable operation (e.g., three to five pings), the feedback logic 122 causes the primary controller 116 to cease producing the open loop control signal (Primary_EN 208) and to switch to closed loop control. Optionally, this can also trigger the primary controller 116 sending a signal to activate spread spectrum modulation (SSM_EN 224). Spread spectrum modulation can be used to vary the frequency of the switch 118 to thereby reduce noise in the power signal received by the output load 124 (via the secondary side 112).

Closed loop control is preferably performed in dependence on the feedback signal 226 from the closed loop controller 128 to the feedback logic 122. Preferably, FB_EN_Secondary 220 is used by the feedback logic 122 to control the primary controller 116 to govern further current 212 ramp by the power supply 114—and thereby, voltage ramp across the output load 124 (ramp of Viso 214). Specifically, in closed loop control, FB_EN_Primary 210 is controlled by—preferably, mirrors—FB_EN_Secondary 222. With feedback available, power is preferably provided across the isolation barrier 104 as quickly as possible while avoiding overshoot.

The total current delivered to the output load 124 and the output capacitor 126 is average $I_{cap}$ plus average $I_{load}$, where $I_{load}$ is the average current across the output load 124 and $I_{cap}$ is the average current across the output capacitance 126. The average current delivered to the output capacitor is described by the following formula: average $I_{cap}$ is proportional to $$C \frac{dVcap}{dt},$$

where C (generally a constant) is the maximum size of the output capacitance 126, and $V_{cap}$ is the voltage across the output load 124. $V_{cap}$ can be equal to $V_{load}$ since the output load 124 and the output capacitance 126 are connected in parallel to power and ground; preferably, $V_{cap}$ is equal to $V_{load}$. $V_{load}$ is measured by the voltage detector 132 and is compared to Vref_FB 220. The average current delivered to the primary side 110 (i.e., power which is transmitted to the secondary side 112)—which determines $$\frac{dVload}{dt}$$

and average $I_{cap}$ plus average $I_{load}$—is controlled in dependence on the feedback signal 226 generated based on the results of said comparison.

The voltage reference Vref_FB 220 is initially proportional to $V_{load}$, and the slope of the ramp curve of Vref_FB 220 is proportional to the slope of the voltage across the output load 124, i.e., proportional to $$\frac{dVload}{dt}.$$

The in-rush current is therefore dependent on the slope of the voltage reference Vref_FB 220 (proportional to $$\left.\frac{dVload}{dt}\right)$$

and the maximum size of the output capacitance 126 (C). Consequently, the portion of the in-rush current that is contributed by $I_{cap}$ can be controlled by controlling $$\frac{dVload}{dt},$$

which, as disclosed herein, is accomplished using the feedback signal 226. For example, if $I_{load}$ is constant, then in-rush current can be held constant by making $$\frac{dVload}{dt}$$

constant (output capacitance 126 will generally be constant).

This means that average $I_{cap}$ can be made relatively small during closed loop control at startup by charging the secondary side relatively slowly during closed loop control at startup. Put differently, $I_{cap}$ can be made small during closed loop control during startup by making $$\frac{dVload}{dt}$$

small, i.e., by ramping Viso 214 relatively slowly. This enables the majority of the in-rush current to be determined by $I_{load}$; and also enables use of a relatively small output capacitance 126 (C), which can decrease both process cost and required device area for implementation of output capacitance 126 within the converter 100.

This also means that for a particular $I_{load}$, which generally corresponds to a particular in-rush current (due to the power transmitted by the transformer 102), higher output capacitance 126 requires slower ramp of the voltage across the output load 124 to maintain that particular in-rush current (i.e., to hold $$C\frac{dV}{dt}$$

to a particular value). That is, the size of the output capacitance 126 will generally be proportional to the in-rush current and inversely proportional to the ramp rate of the voltage across the output load 124 (output voltage Viso 214).

After some period of time in closed loop control (e.g., 2.5 ms), the output load 124 will be fully charged and the startup cycle of the converter 100 will be complete at time $t_8$. Detection of the fully charged state can be performed by comparison of the output voltage Viso 214 against the bandgap voltage reference Vbg_Secondary 216 (e.g., using a resistor-divider circuit).

FIG. 2B shows an example of a feedback signal 226, plotting voltage over time. As shown in FIG. 2B, the low frequency FB_EN_Secondary 222, which depends on a comparison between Vref_FB 220 (preferably a bandgap reference) and Viso 214 (the voltage across the output load 124), is combined with the high frequency ping 228 to produce the feedback signal 226. As described above, the feedback signal 226 is used by the primary controller 116 to finely control provision of current 212 (power) to the primary side 110 of the transformer 102 during closed loop control.

FIG. 2C shows an example of an electrical block diagram of a circuit 230 for generating a ramping voltage used to generate the feedback signal 226. A Vref_FB Generator 232 comprises logic used to determine which of several input signals is connected to charge an internal capacitor Cint 234. Vref_FB 220 corresponds to the charge across Cint 234. Preferably, between t6 and t7, Viso 214, scaled down by the Vref_FB Generator 232 using a resistor-divider, is connected to Cint 234, such that at time t7 Cint 234 preferably equals the scaled-down Viso 214. Between time t7 and time t8 (i.e., once POR_Secondary 218 has been activated and before Viso 214 is fully charged), Cint 234 is preferably connected to Vramp 236. Vramp 236 is preferably a fixed voltage level determined by a current source Ibias 238 (preferably current from the bandgap reference which produces Vbg_Secondary 216) controlled by a ramp control switch 240. The ramp control switch 240 is preferably controlled by a Clock Pulse produced by a Clock 242 with a fixed duty cycle. After time t8 (after Viso 214 is fully charged), the Vref_FB Generator 232 preferably connects Cint 234 to Vbg_Secondary 216 (i.e., the fully-ramped value of Vref_FB 220).

Figure 3:
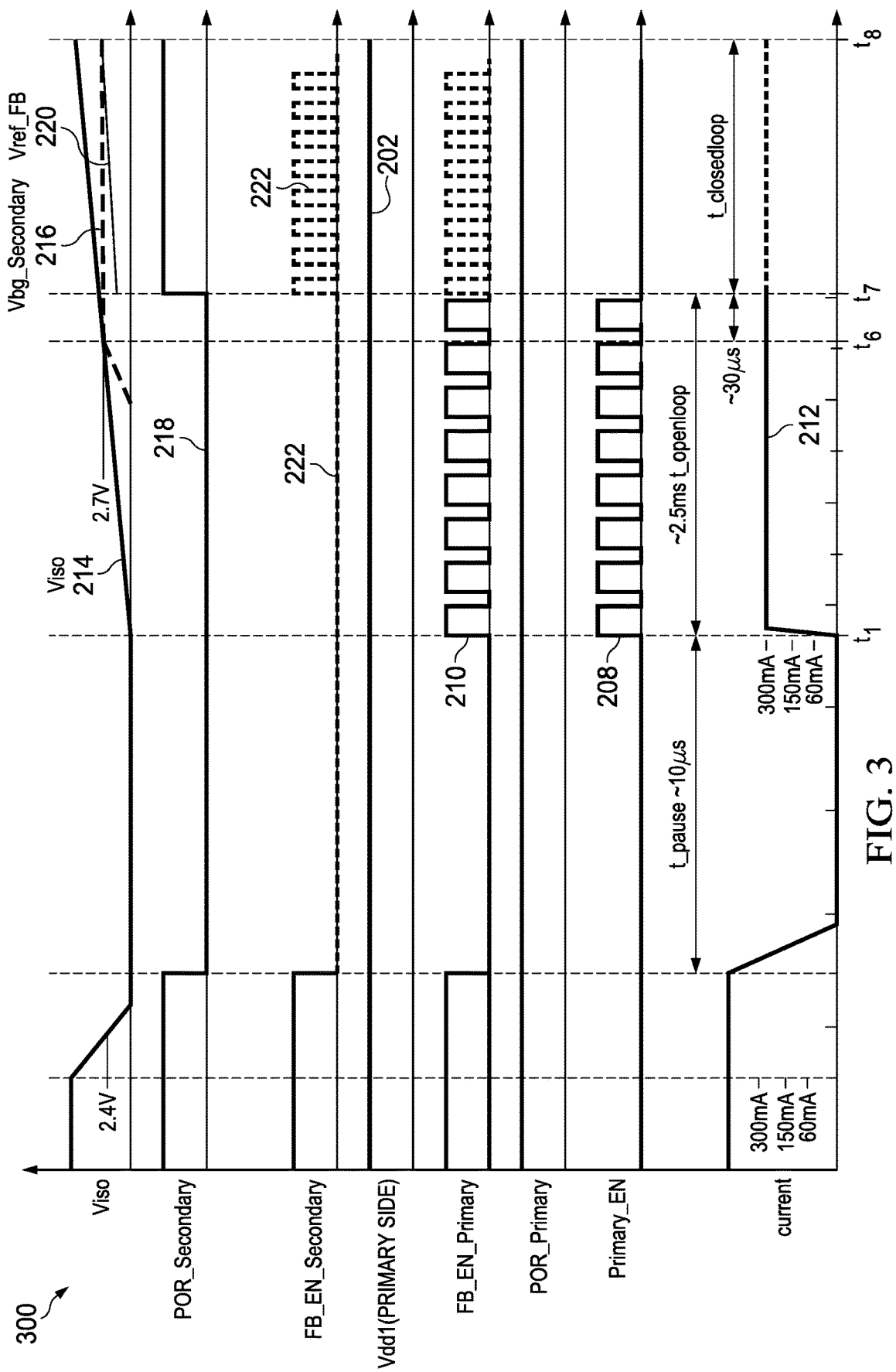
FIG. 3 shows an example of a timing diagram for an isolated DC-DC converter with feedback across the isolation barrier of a transformer to thereby control in-rush current, in which the output side of the converter experiences a transient short circuit event.

FIG. 3 shows an example of a timing diagram 300 for an isolated DC-DC converter 100 with feedback across the isolation barrier 104 of a transformer 102 to thereby control in-rush current, in which the output side 108 of the converter 100 experiences a transient short circuit event. As shown in FIG. 3, a converter 100 starts out at fully charged operation. For example, FB_EN_Primary 210 is high (not switching on and off), indicating 100% duty cycle of the switch 118, meaning that maximum current 212 (maximum power) is being provided to the primary side 110, across the isolation barrier 104, to the secondary side 112, and thence to the output load 124.

As shown in FIG. 3, the converter 100 experiences a transient short event, such as a (brief) short across the output load 124, at a particular time 302, after which Viso 214 drops below an output fault voltage threshold 304 (e.g., 2.4V). After a brief delay related to discharging of components on the output side 108, the closed loop controller 128 ceases producing POR_Secondary 218, FB_EN_Secondary 222 and the ping. Deactivation of the ping then causes the feedback logic 122 to cause the primary controller 116 to allow FB_EN_Primary 210 to go low, thereby controlling the power supply 114 (using the switch 118) to cease providing current 212 to the primary side 110.

Figure 4:
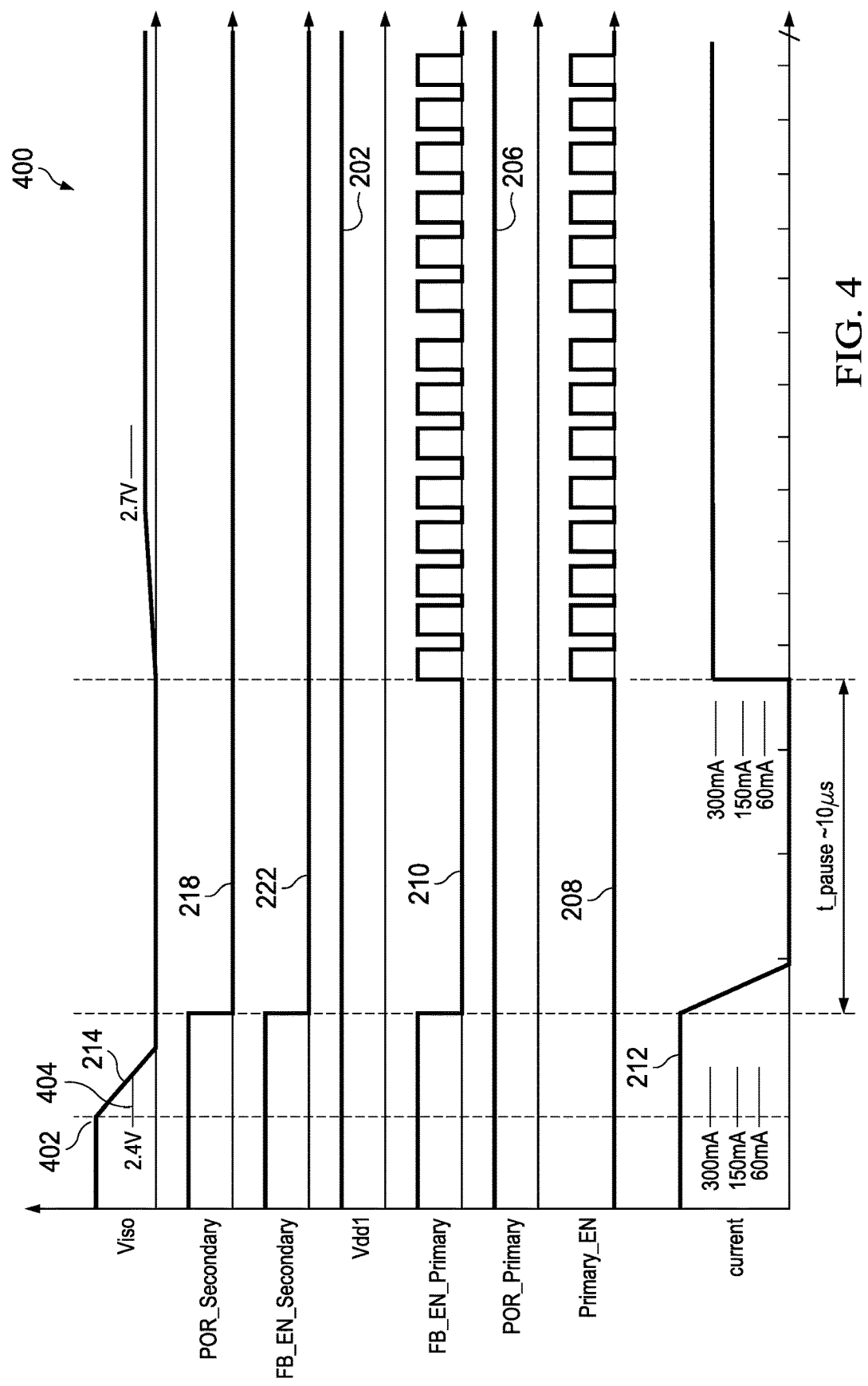
FIG. 4 shows an example of a timing diagram for an isolated DC-DC converter with feedback across the isolation barrier of a transformer to thereby control in-rush current, in which the output side of the converter experiences a sustained DC short circuit event.

After a delay (e.g., 10 μs), the primary controller 116 resumes producing Primary_EN 208 (reenters open loop control) and FB_EN_Primary 210, thereby controlling the power supply 114 (using the switch 118) to resume providing current 212 to the primary side 110. Preferably, current 212 is initially provided at a pre-selected level (e.g., 50% to 75% of maximum, such as 300 mA) that is high enough to power the output side 108 sufficiently for resumption of closed loop control if the fault has abated, but low enough in an attempt to avoid damage if the fault continues to affect the output side 108. If the fault has abated (as shown in FIG. 3), then startup proceeds as shown in FIG. 2. FIG. 4 shows an example of signal timing if the fault does not promptly abate (e.g., if a short circuit remains in effect for a longer period).

FIG. 4 shows an example of a timing diagram 400 for an isolated DC-DC converter 100 with feedback across the isolation barrier 104 of a transformer 102 to thereby control in-rush current, in which the output side 108 of the converter 100 experiences a sustained DC short circuit event. As shown in FIG. 4, a converter 100 starts out at fully charged operation. The converter 100 experiences a DC short event, such as a short across the output load 124, at a particular time 402, after which Viso 214 drops below an output fault voltage threshold 404. In the example illustrated in FIG. 4, the fault remains in effect. Behavior continues as shown in and described above with respect to FIG. 3, except that when Viso 214 subsequently begins to ramp, it is unable to reach the output threshold voltage because of the ongoing short circuit. This means that POR_Secondary 218 does not reactivate, which means that FB_EN_Secondary 222 does not reactivate, which means that the converter 100 remains in open loop control, current 212 is not ramped above the initial pre-determined reactivation value, and the output load 124 is not fully driven. This state will generally continue until the converter 100 is turned off and/or the short circuit is repaired.

Figure 5:
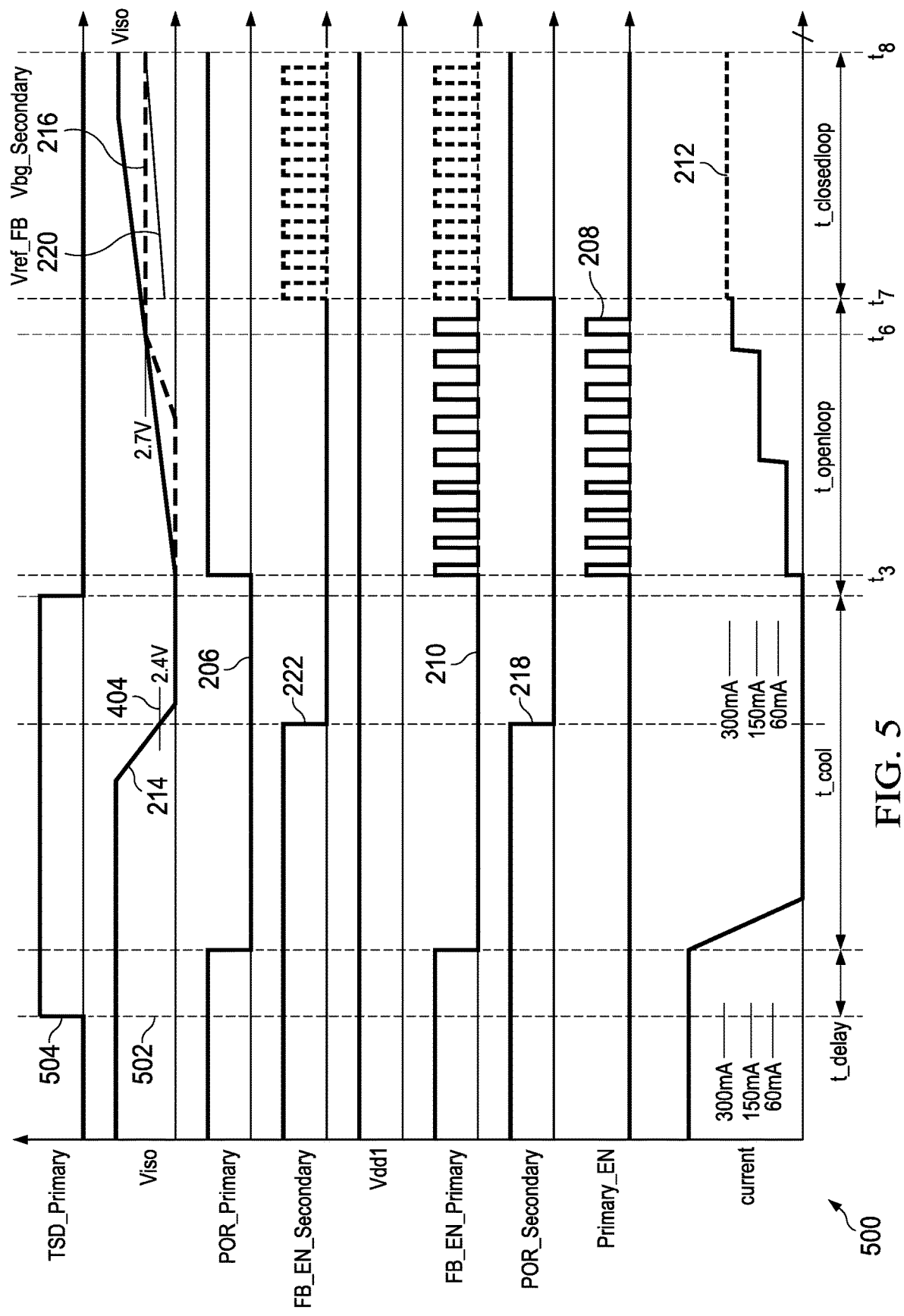
FIG. 5 shows an example of a timing diagram for an isolated DC-DC converter with feedback across the isolation barrier of a transformer to thereby control in-rush current, in which the converter experiences a thermal shutdown event.

FIG. 5 shows an example of a timing diagram 500 for an isolated DC-DC converter 100 with feedback across the isolation barrier 104 of a transformer 102 to thereby control in-rush current, in which the converter 100 experiences a thermal shutdown event.

Generally, if the converter 100 is fabricated within a single package (e.g., within an IC package), then measuring temperature on one side of the converter 100 (e.g., the input side 106) is sufficient to determine when the power supply 114 should enter a thermal shutdown state.

When an excessive temperature is detected (e.g., ~160° C. to ~170° C.) at a particular time 502, a thermal shutdown signal TSD_Primary 504 is generated, such as by the primary controller 116 in response to a monitored thermal sensor or representative thermal signal. In response to TSD_Primary 504, the primary controller 116 causes POR_Primary 206 and FB_EN_Primary 210 to go low, resulting in current 212 to cease being transmitted to the primary side 110 and thence to the output load 124. Viso 124 consequently falls, resulting in POR_Secondary 218 and FB_EN_Secondary 222 going low once Viso 124 goes below a fault threshold voltage (e.g., 2.4V). The converter 100 then cools down over a period of time (t_cool). Once the converter's 100 temperature is measured as falling below a cooling threshold (e.g., 140° C.), TSD_Primary 226 goes low, and after a brief signal-propagation delay, the startup sequence shown in FIG. 2 is performed (as shown in FIG. 5).

Figure 6:
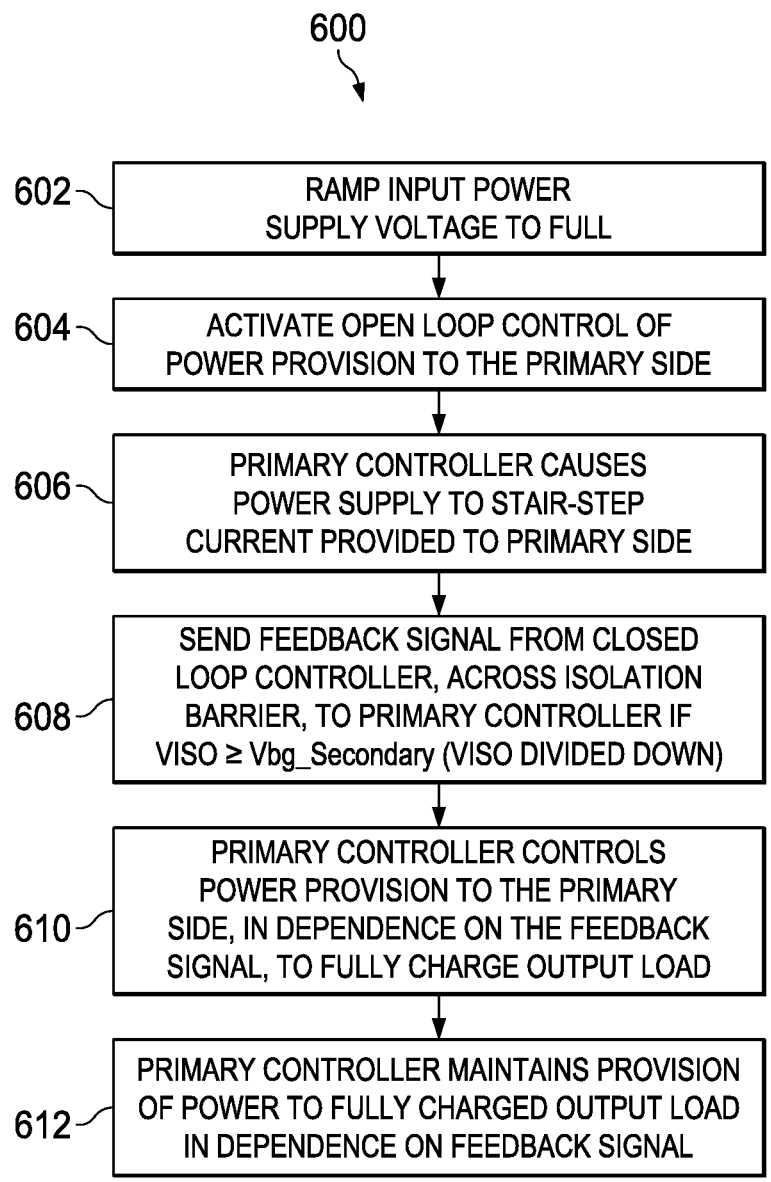
FIG. 6 shows an example of a process diagram for a startup cycle for an isolated DC-DC converter with feedback across the isolation barrier of a transformer to thereby control in-rush current.

FIG. 6 shows an example of a process diagram 600 for a startup cycle for an isolated DC-DC converter 100 with feedback across the isolation barrier 104 of a transformer 102 to thereby control in-rush current. As shown in FIG. 6, a startup cycle begins with a power supply 114 ramping its voltage to a fully charged level in step 602. Open loop control of provision of power by the power supply 114 to the primary side 110 of the transformer 102 is activated in step 604. The power supply 114 causes current provided to the primary side 110 to increase in a stair-stepped manner, increasing at predetermined times to predetermined levels, at step 606. If an output voltage (e.g., measured across the output load 124) is equal to or greater than a reference voltage (e.g., a bandgap reference), then the output side 108 closed loop controller 128 begins sending a feedback signal 226 to the input side 106 in step 608. The content of the feedback signal 226 depends on a comparison between Vref_FB 220 (a ramped reference voltage initially based on Viso 214) and Viso 214. The primary controller 116 uses the switch 118 to control provision of power from the power supply 114 to the primary side 110 in dependence on the feedback signal 226, completing output voltage ramp, in step 610. The primary controller 116 then controls the switch 118 to maintain provision of power across the isolation barrier 104 in dependence on the feedback signal in step 612.

Figure 7:
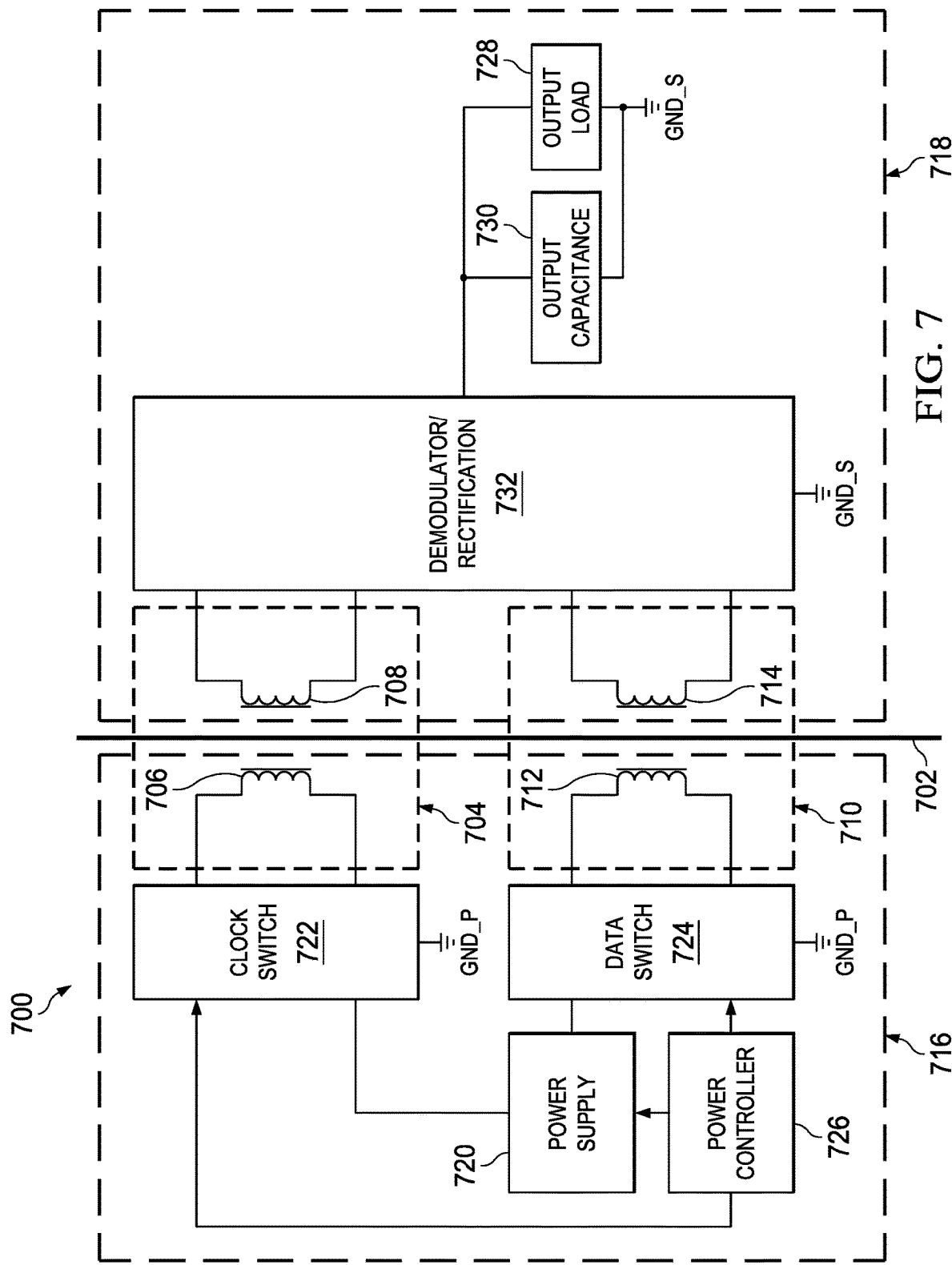
FIG. 7 shows an example of an electrical block diagram of an isolated DC-DC converter with two transformers to transmit respective clock and data signals across an isolation barrier.

FIG. 7 shows an example of an electrical block diagram of an isolated DC-DC converter 700 with two transformers, one operable in part to transmit a clock signal across an isolation barrier 702, and the other operable in part to transmit a data signal across the isolation barrier 702. As shown in FIG. 7, a first transformer 704 has a primary side 706 and a secondary side 708, and a second transformer 710 has a primary side 712 and a secondary side 714. The converter 700 has an input side 716 and an output side 718. The input side 716 comprises a power supply 720 connected to the two primary sides 706, 712 via a clock switch 722 (for transmitting the clock signal) and a data switch 724 (for transmitting the data signal) to thereby provide power to the respective primary sides 706, 712. The clock switch 722 and the data switch 724 are both preferably connected to a primary side ground GND_P. The input side 716 also comprises a power controller 726 configured to control the open-close cycles of the clock and data switches 722, 724.

The output side 718 comprises an output load 728 and an output capacitance 730 (as described with respect to FIG. 1) electrically connected in parallel to the secondary sides 708, 714. The output load 728 corresponds to an output of the converter 700. The output side 718 also comprises a demodulator/rectification 732 for receiving and decoding the clock and data signals transmitted across the transformers 704, 710; for making the output of the converter 100 resemble DC current; and for providing the output load 728 and output capacitance 730 with power comprising the rectified and interleaved outputs of the secondary sides 708, 714. The output load 728, the output capacitance 730 and the demodulator/rectification 732 are preferably connected to a secondary side ground GND_S.

The power controller 726 controls the clock switch 722 to open and close at a frequency selected to deliver one or more predetermined current levels to the primary side 706 of the first transformer 704 such that the secondary side 708 of the first transformer 704 receives a signal that can be used (either with or without further alteration) as a clock signal. The power controller 726 also controls the data switch 724 to open and close at a frequency selected to deliver one or more predetermined current levels to the primary side 712 of the second transformer 710. The power controller 726 further modulates the open-close cycle of the data switch 724 in dependence on a selected data signal to be transmitted by the second transformer 710 across the isolation barrier 702. For example, a signal controlling the data switch's 724 open-close state can be XOR'd with the selected data signal.

The power controller 726 also controls the clock and data switches 722, 724 to provide current to the primary sides 706, 712 so that the output load 728 will be ramped to and/or maintain a selected charge state. That is, the clock and data functions, which the power controller 726 controls the clock and data switches 722, 724 to perform, are executed in a manner selected to avoid interfering with the power provision functions of the converter 700.

Clock and data communications from the primary side 706 to the secondary side 708 can be synergistically be combined with feedback from a secondary side 112 to a primary side 110 (as disclosed with respect to FIGS. 1-6) to enable bidirectional communication across an isolation barrier 104, 702 of an isolated DC-DC converter 100, 700.

The disclosed innovations, in various embodiments, provide one or more of at least the following advantages. However, not all of these advantages result from every one of the innovations disclosed, and this list of advantages does not limit the various claimed inventions.

Enables rapid isolated DC-DC converter power ramp while preventing overshoot;
enables fully integrated isolated DC-DC converter with soft start;
enables scalable power solutions (low to high power) without requiring extremely low source impedance;
enables feedback from the output side to the input side, across the isolation barrier, during power ramp on startup;
programmable current ramping values in open loop control;
enables limiting input and output current during startup and short circuit events in a controlled and well defined manner;
adapts input current to load current, even in the absence of direct feedback from output to input during startup;
enables reduction in input current during startup without using an external capacitor;
enables communication of data and clock signals from a primary side to a secondary side using two transformers.

Methods, systems and devices are disclosed for controlling provision of power using an isolated DC-DC converter to prevent overshoot on startup. This is done by providing power to the primary side of a transformer at a pre-determined increasing rate until a secondary side of the transformer has received sufficient power to initiate feedback communications; then sending a feedback signal from the output side of the converter to the input side of the converter that continuously indicates how much power should be provided to the primary side to continue rapidly charging an output load connected to the secondary side, and controlling provision of power to the primary side in dependence on the feedback signal to charge the output load.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

In some embodiments, said feedback signal has a high frequency component and a low frequency component.

In some embodiments, said high frequency component comprises a ping indicating that said secondary side is, without fault, receiving power transmitted by said primary side.

In some embodiments, said low frequency component is selected in dependence on a comparison between said voltage and a ramped reference voltage.

In some embodiments, average current being delivered to the primary side of the transformer is determined by measuring the voltage across the power supply.

In some embodiments, temperature is monitored, and serves as a control, on both the input side and the output side of the converter.

In some embodiments, a converter comprises 3.3V or 5V CMOS. In some embodiments, a converter comprising 3.3V or 5V CMOS can interface across a high voltage gap, such as a 1000 volt or 1500 volt difference between the primary side ground and the secondary side ground.

In some embodiments, a clock producing a clock pulse (as described with respect to FIG. 2C) can have a variable duty cycle, e.g., depending on a signal transmitted across the isolation barrier by the transformer, by an external or application-dependent input value, or by a value read from a memory.

In some embodiments, when a feedback signal from a secondary side to a primary side of an isolated DC-DC converter indicates that voltage across an output load is ramping too quickly, a primary controller can control a switch to decrease the amount of current provided to the primary side of the transformer.

In some embodiments, an activation (turn-on) or fault (turn-off) threshold voltage for closed loop control (see, e.g., Vbg_Secondary) can comprise high and/or low fixed reference voltages, as in a hysteretic controller paradigm; or can comprise a saw-toothed waveform, a ramped oscillation, or another oscillating waveform around a fixed or variable reference voltage, as in a pulse width modulation (PWM) controller paradigm. In some embodiments, other threshold voltages can use a hysteretic or PWM controller paradigm. In some embodiments, other types of voltage comparisons can be used to indicate a threshold energy level through or across a specified component of an isolated DC-DC converter. Those of ordinary skill in the art will understand that in this application, references to comparisons between a tested voltage level and a threshold voltage can include corresponding hysteretic, PWM, or other types of comparisons; wherein references to exceeding a threshold voltage (e.g., a closed loop control activation threshold voltage) correspond to exceeding a specified and/or predetermined energy level, and references to falling below a threshold voltage (e.g., falling below an output side fault threshold voltage) correspond to falling below a specified and/or predetermined energy level.

According to some but not necessarily all embodiments, there is provided: a method of providing electrical power using an isolated DC-DC converter, comprising the actions of: a) providing current to a primary side of a transformer at multiple predetermined open loop current levels using a power supply, said power supply providing said open loop current levels in increasing amplitude order and at predetermined times, said open loop current levels and times being selected to ramp a voltage across output terminals connected to a secondary side of said transformer so that after said power supply provides a maximum one of said open loop current levels, said voltage reaches a threshold sufficient to enable a closed loop controller connected to said output terminals to send a feedback signal to said primary side, said threshold being insufficient to fully power said output terminals; and b) sending said feedback signal to said primary side using said closed loop controller when said voltage reaches said threshold, said power supply controlled in response to said feedback signal to continue providing current to said primary side at closed loop current levels, said feedback signal selected to control said power supply to increase said closed loop current levels until said output terminals are fully powered.

According to some but not necessarily all embodiments, there is provided: an isolated DC-DC converter, comprising: a transformer with a primary side and a secondary side; a power supply configured to provide current to said primary side, said power supply configured such that, during a startup cycle of the converter, said power supply increases said current to predetermined levels at predetermined times; multiple output terminals connected to said secondary side; a voltage detector configured to detect a voltage across said output terminals; a closed loop controller configured to send a feedback signal to said power supply when said voltage detector measures said voltage as exceeding a closed loop threshold, said closed loop threshold being greater than a voltage required for said closed loop controller to send said feedback signal and less than a fully powered level of said output terminals; wherein said feedback signal controls said power supply to adjust said current until said feedback signal communicates that said voltage has reached said fully powered level.

According to some but not necessarily all embodiments, there is provided: an isolated DC-DC converter, comprising: a first transformer with a primary side and a secondary side; a second transformer with a primary side and a secondary side; a power supply electrically connected to provide current to said transformers; a clock switch electrically connected to said power supply and said first transformer's primary side, said clock switch configured to control provision of said current to said first transformer's primary side such that an open-close frequency of said clock switch will cause said first transformer's secondary side to output a device clock signal at a selected clock frequency; a data switch electrically connected to said power supply and said second transformer's primary side, said data switch configured to control provision of said current to said second transformer's primary side such that an open-close frequency of said data switch will cause said second transformer's secondary side to output a data signal comprising selected data; and multiple output terminals, said output terminals being electrically connected to said secondary sides of said first and second transformers, said frequencies of said clock switch and said data switch being selected to maintain a selected voltage across said output terminals.

According to some but not necessarily all embodiments, there is provided: methods, systems and devices for controlling provision of power using an isolated DC-DC converter to prevent overshoot on startup. This is done by providing power to the primary side of a transformer at a pre-determined increasing rate until a secondary side of the transformer has received sufficient power to initiate feedback communications; then sending a feedback signal from the output side of the converter to the input side of the converter that continuously indicates how much power should be provided to the primary side to continue rapidly charging an output load connected to the secondary side, and controlling provision of power to the primary side in dependence on the feedback signal to charge the output load.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 114 unless the exact words "means for" are followed by a participle.

The claims as filed are intended to be as comprehensive as possible, and NO subject matter is intentionally relinquished, dedicated, or abandoned.

As shown and described herein, the inventors have discovered a variety of new and useful approaches to preventing excessive in-rush current during startup of an isolated DC-DC converter, and thereby preventing voltage overshoot across the output load terminals of the converter.

The inventors have also discovered a variety of new and useful approaches to transmitting clock and data signals from the primary side to the secondary side of an isolated DC-DC converter.

What is claimed is:

1. A method of providing electrical power using an isolated DC-DC converter, comprising the steps of:
   a) providing current to a primary side of a transformer by incrementally increasing the current by pre-determined amounts at pre-determined intervals in a stair-stepped manner using a power supply and a switch, the switch receiving a control signal from a primary controller that receives an input current measurement from a current detector, causing a voltage to ramp across output terminals connected to a secondary side of the transformer so that after the power supply provides a maximum current, the voltage reaches a threshold sufficient to enable a closed loop controller connected to the output terminals to send a feedback signal to the primary side, the feedback signal consisting of a high frequency component and a low frequency component and being encoded by applying an exclusive-OR function to the feedback signal and the control signal for the switch, the threshold being insufficient to fully power the output terminals; and
   b) sending the feedback signal to the primary side when the voltage reaches the threshold using the closed loop controller, the power supply controlled in response to the feedback signal to continue providing current to the primary side at closed loop current levels, the feedback signal selected to control the power supply to increase the closed loop current levels in a stair-stepped manner until the output terminals are fully powered.

2. The method of claim 1, further including adjusting an output of the power supply to produce the stair-stepped current levels.

3. The method of claim 2, wherein the adjusting includes selecting a ratio, in an open-closed cycle of the switch, between a duration during which the switch is open and a duration during which the switch is closed.

4. The method of claim 3, further including modulating the open-closed cycle of the switch to communicate a specified signal to the closed loop controller.

5. The method of claim 1, wherein the high frequency component of the feedback signal includes a ping indicating that the secondary side is, without fault, receiving power transmitted by the primary side.

6. The method of claim 1, wherein the low frequency component of the feedback signal is selected in dependence on a comparison between the voltage and a ramped reference voltage.

7. The method of claim 1, further comprising determining whether the voltage has reached the threshold by comparing the voltage against a bandgap reference voltage.

8. The method of claim 1,
wherein if the voltage drops below a fault threshold voltage, the closed loop controller will cease to send the feedback signal; and
wherein if the feedback signal ceases to be sent, the power supply will cease to provide current to the primary side.

9. The method of claim 1, further including:
initially generating a ramped voltage by sampling the voltage;
ramping the ramped voltage using a current source connected to a capacitor having a rate of charge that is controlled by a ramp control switch, the ramp control switch being controlled by a clock pulse with a duty cycle, the ramped voltage corresponding to a voltage across the capacitor; and
generating the feedback signal in dependence on a comparison between the ramped voltage and the voltage.

10. An isolated DC-DC converter, comprising: a transformer with a primary side and a secondary side; a power supply configured to provide current to the primary side; a current detection circuit measuring an input current; a primary controller that receives the input current measurement from the current detector and is to cause, during a startup cycle of the isolated DC-DC converter, the power supply to increase the current in a stair-stepped manner; a switch controlled by the primary controller and electrically connected to the primary side; multiple output terminals connected to the secondary side; a voltage detector configured to detect a voltage across the output terminals, a closed loop controller configured to send a feedback signal to the power supply when the voltage detector measures the voltage as exceeding a closed loop threshold, the feedback signal consisting of a high frequency component and a low frequency component and being encoded by applying an exclusive-OR function to the feedback signal and a control signal for the switch, the closed loop threshold being greater than a voltage required for the closed loop controller to send the feedback signal and less than a fully powered level of the output terminals; wherein the feedback signal is decoded using a logic circuit and sent to the primary controller which controls the power supply to adjust the current until the feedback signal communicates that the voltage has reached the fully powered level.

11. The converter of claim 10, wherein the primary controller is configured to control the switch to execute the current increases by changing a ratio, in an open-closed cycle of the switch, between the duration during which the switch is open and the duration during which the switch is closed.

12. The converter of claim 11, wherein the primary controller is configured to control the switch to modulate the open-closed cycle to communicate a specified signal across an isolation barrier of the transformer.

13. The converter of claim 10, further including an output capacitance connected to the secondary side in parallel with the output terminals, a capacitance of the output capacitance being selected in at least partial dependence on a selected rate of ramp of the voltage.

14. The converter of claim 10, wherein the closed loop controller is configured to produce the feedback signal with the high frequency component and the low frequency component.

15. The converter of claim 14, wherein the closed loop controller is configured to produce the high frequency component in dependence on whether the secondary side is receiving, without fault, power transmitted by the primary side.

16. The converter of claim 10, further comprising a bandgap reference, wherein the closed loop controller is configured to determine whether the closed loop threshold has been reached by comparing the voltage against a voltage across the bandgap reference.

17. The converter of claim 10,
wherein the closed loop controller is configured to cease sending the feedback signal if the voltage drops below a fault threshold voltage; and
wherein the power supply is configured to cease providing the current to the primary side if the power supply ceases to receive the feedback signal.

18. The converter of claim 10, wherein the closed loop controller is configured to communicate to the power supply using the feedback signal when the voltage detector measures the voltage as having reached the fully powered level; and the power supply is configured to cease increasing the current provided to the primary side when the feedback signal indicates the fully powered level.

19. The converter of claim 10, further including:
a clock configured to generate a clock pulse; and
a current source connected to a capacitor, a rate at which the current source charges the capacitor being controlled by a ramp control switch controlled using the clock pulse, a ramped voltage corresponding to a voltage across the capacitor,
wherein the closed loop controller is configured to generate the feedback signal in dependence on a comparison between the ramped voltage and the voltage.

* * * * *